US00RE42978E

(19) United States
(12) Reissued Patent
Haneda

(10) Patent Number: US RE42,978 E
(45) Date of Reissued Patent: Nov. 29, 2011

(54) IMAGE CAPTURING DEVICE

(75) Inventor: Kazuhiro Haneda, Tokyo (JP)

(73) Assignee: Olympus Corporation (JP)

(21) Appl. No.: 11/799,759

(22) Filed: May 2, 2007

Related U.S. Patent Documents

Reissue of:

(64) Patent No.: 7,099,391
Issued: Aug. 29, 2006
Appl. No.: 09/897,679
Filed: Jul. 2, 2001

(30) Foreign Application Priority Data

Jul. 3, 2000 (JP) ..... 2000-201161

(51) Int. Cl.
*H04N 7/18* (2006.01)

(52) U.S. Cl. ..... 375/240.26; 375/240.12

(58) Field of Classification Search . 375/240.01–240.29
See application file for complete search history.

(56) References Cited

U.S. PATENT DOCUMENTS 5,832,323 A * 11/1998 Goto ..... 396/297
6,163,656 A * 12/2000 Yoshioka ..... 396/429
6,754,279 B2 * 6/2004 Zhou et al. ..... 375/240.28
6,763,178 B1 * 7/2004 Suzuki et al. ..... 386/95

* cited by examiner

*Primary Examiner* — Andy Rao
(74) *Attorney, Agent, or Firm* — Ostrolenk Faber LLP

(57) ABSTRACT

An image capturing device for capturing an image by an imaging device comprises first compression means for compressing and coding a captured image as a moving image, extracting means for extracting object information relating to a desired object from moving image information obtained in the process of compressing and coding the captured image, image processing means for performing desired image processing on the desired object on the basis of the object information extracted by the extracting means, second compression means for compressing and coding an image including the desired object processed by the image processing means as a still image, and recording means for recording, on a recording medium, at least one of moving image data obtained by the first compression means and still image data obtained by the second compression means.

12 Claims, 5 Drawing Sheets

IMAGE CAPTURING DEVICE

Matter enclosed in heavy brackets [ ] appears in the original patent but forms no part of this reissue specification; matter printed in italics indicates the additions made by reissue.

CROSS-REFERENCE TO RELATED APPLICATIONS

This application is based upon and claims the benefit of priority from the prior Japanese Patent Application No. 2000-201161, filed Jul. 3, 2000, the entire contents of which are incorporated herein by reference.

BACKGROUND OF THE INVENTION

1. Field of the Invention

The present invention relates to an image capturing device and, in particular, to the technique of performing image processing on a desired object, that is, a desired subject, on the basis of image information of a captured image.

2. Description of the Related Art

In the case where a still image is to be obtained from an image taken by a digital camera in an attempt to perform image processing on a desired object such as a person, an external device such as a personal computer has conventionally been used by which it is processed by dedicated software.

In the above-mentioned conventional technique, however, the image processing is performed by an external device such as a personal computer, etc., and it has not been possible to perform image processing of a desired object in real time. For this reason, there has been a problem that a still image subjected to image processing on site was not able to be confirmed.

BRIEF SUMMARY OF THE INVENTION

It is accordingly the object of the present invention to provide an image capturing device which can perform image processing on a desired object in real time.

The present invention is directed to an image capturing device for capturing an image by an imaging device, comprising first compression means for compressing and coding a captured image as a moving image, extracting means for extracting object information relating to a desired object from moving image information obtained in the process of compressing and coding the captured image, image processing means for performing desired image processing on the desired object on the basis of the object information extracted by the extracting means, second compression means for compressing and coding an image including the desired object processed by the image processing means as a still image, and recording means for recording, on a recoding medium, at least one of moving image data obtained by the first compression means and still image data obtained by the second compression means.

In the image capturing device it is preferable that the image processing means can perform a plurality of kinds of image processing and each image processing can be selected for each object.

In the image capturing device, it is preferable that the extracting means has designating means for designating the desired object.

Preferably, the image capturing device further comprises displaying means for displaying the captured image and the displaying means can display the object information extracted by the extracting means.

Preferably, the image capturing device further comprises designating means for designating the desired object from the image displayed on the displaying means and setting means for setting an imaging condition to the desired object designated by the designating means.

Preferably, the image capturing device further comprises replacing means for replacing a certain still image by a moving image on the basis of a moving image located before or after the certain still image in a time-base direction, the replaced moving image being outputted to the first compression means.

Preferably, in the image capturing device, the recording means can record image data on a different recording medium in accordance with the kind of image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawing.

Figure 1:
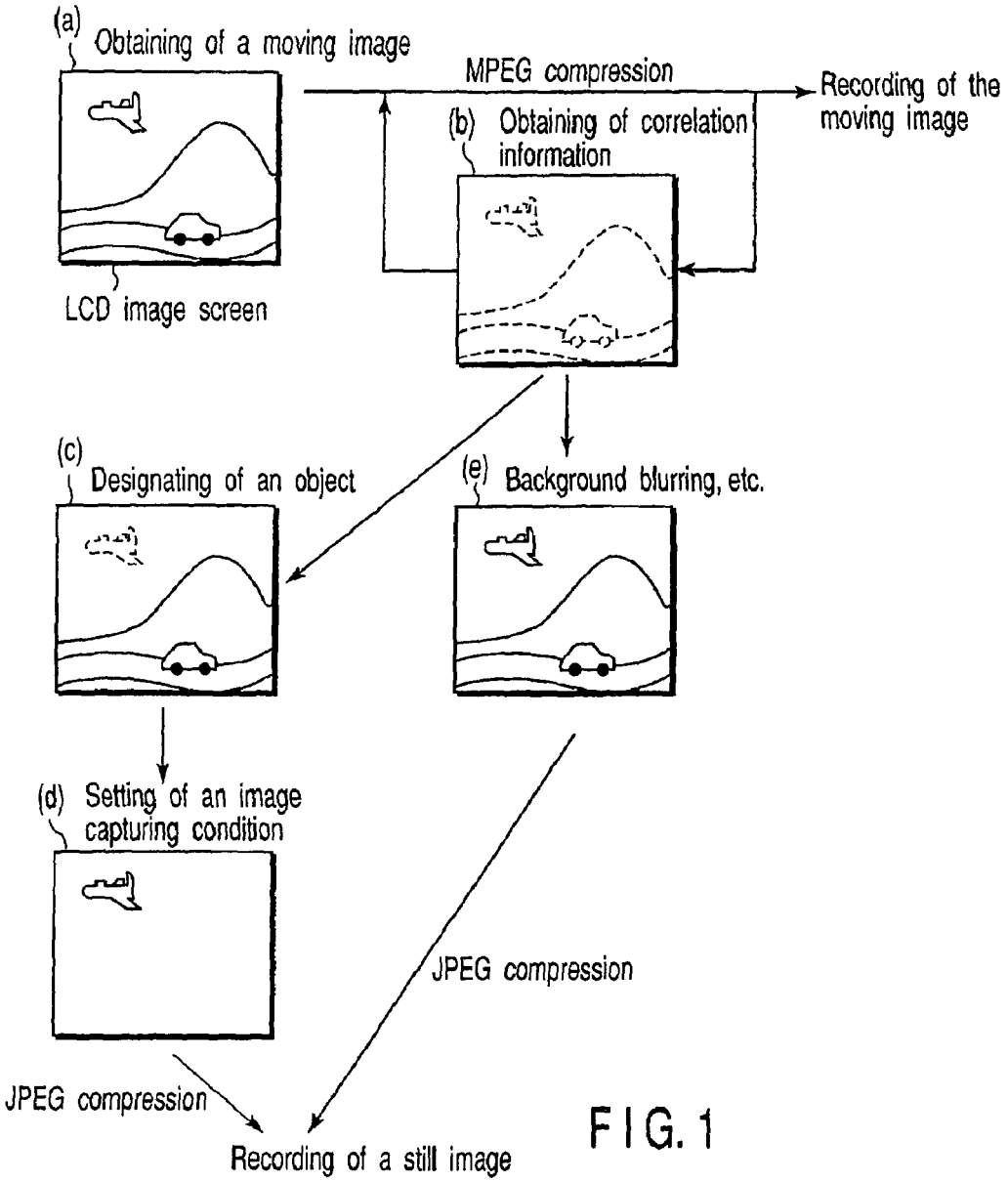
FIG. 1 is a view for explaining an outline of an embodiment of the present invention.

FIG. 1 is a view for giving an explanation about the embodiment of an image capturing device.

In a digital camera, a moving image is taken at a rate of, for example, 30 frames/sec. (processing a). The moving image thus taken in the digital camera is compressed by predetermined compressing and coding processing (here, MPEG compression processing). In a moving image recording mode, compressed moving image data is recorded on a recording medium, such as a hard disk. In the MPEG compression processing, the compression of the image is achieved by utilizing interframe and intraframe correlation information. The information about an object, that is, a subject, included in the moving image is extracted from the course of the compression processing (processing b). In an example illustrated, the information of aircraft, automobile, background, etc., is extracted. The following processing can be done by utilizing the extracted object information.

Processing c and processing d extract only a designated object and set the image capturing condition, etc., as will be briefly explained below.

On an LCD image screen (constituting a finder) displaying the moving image, designatable objects are displayed in a visually recognizable way, for each object, on the basis of the extracted object information. For example, the designatable objects are displayed in a visually recognizable way by an enhanced outline, flashing ON/OFF, change of display colors, etc. The photographer selects an object extracting mode and designates one or more desired objects from those objects included in the moving image displayed on the LCD image screen. For example, the photographer designates a desired object on the LCD by using a marker. Here, it is assumed that the aircraft as indicated by a broken line is designated. After the desired object has been designated, the setting of the image capturing condition, such as an AE (auto-exposure) and AF (auto-focusing), is automatically made to the designated object by depressing a release switch and only a designated object is taken as a still image. The thus taken still image data is compressed by a predetermined compressing and coding processing (here, JPEG compression precessing) and the compressed still image data is recorded on a recording medium, such as a hard disk.

Processing c performs image processing different from object to object as will be briefly explained below.

The photographer selects an edit processing mode and designates the desired processing, for each object, such as the later-described background blurring processing, adaptive tone curve correction processing, adaptive edge emphasis processing and skin color correction processing. Each object can be designated by the marker and desired processing is performed on the respective designated object. After such a designated operation, the release switch is depressed and, by doing so, an image on which the designated processing is performed for each designated object is taken as a still image. The still image data thus obtained is compressed by the predetermined compressing and coding processing (JPEG compression processing) and the compressed still image data is recorded on the recording medium, such as the hard disk.

Figure 2:
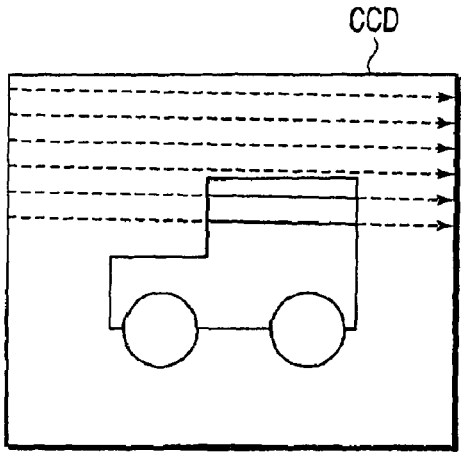
FIG. 2 is a view showing, as a model, a processing operation on a CCD when respective kinds of processing are done in a still image capture on the embodiment of the present invention.

FIG. 2 shows, as a model, a processing operation on a CCD when the above-mentioned respective processing is done in the capturing of a still image. As shown in FIG. 2, designated processing is done only on a designated object (in FIG. 2, an automobile) and no such processing is done on the remaining portion (in FIG. 2, a background portion).

In the embodiment of the present invention, as set out above, the information relating to an object is extracted from the moving image information obtained in the compressing and coding process and desired image processing (signal processing) is selectively performed only on the extracted object. For this reason, the image processing can be effectively performed only on a desired object in real time. It is, therefore, not necessary to perform image processing, like the prior art, with the use of an external device such as a personal computer and it is possible to readily confirm a still image, at its capturing location, on which desired image processing is done.

(Structure)

Figure 3:
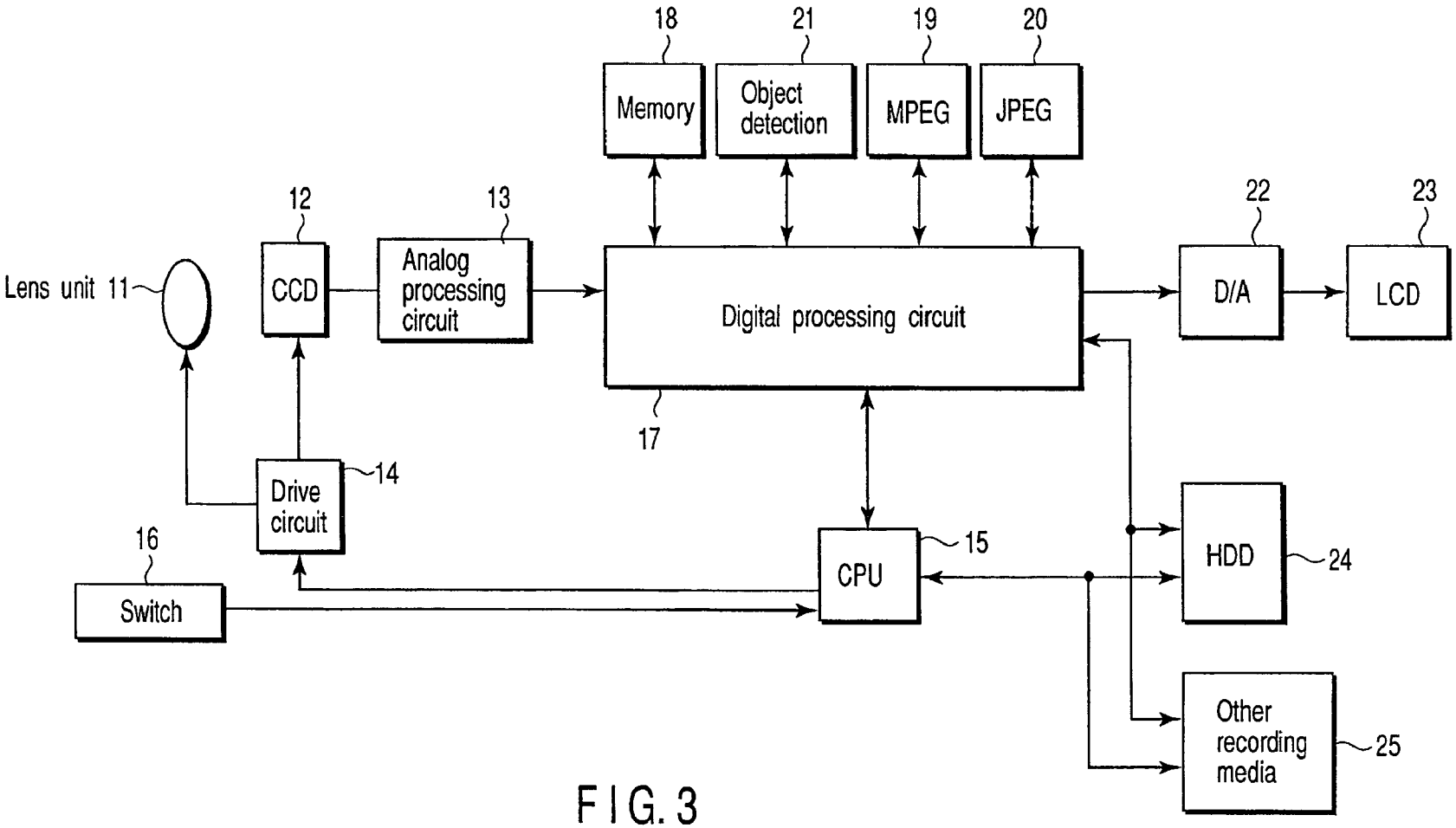
FIG. 3 is a block diagram showing a major arrangement of an image capturing device according to the embodiment of the present invention.

FIG. 3 is a block diagram showing a structure of a main section of an image capturing device according to the embodiment of the present invention.

The basic structure of an image capturing section is similar to an ordinary digital camera and comprises a lens unit 11 (image lens, diaphragm, shutter, etc.), a CCD (imaging device) 12 for performing photo-electric conversion of a subject image from the lens unit 11, an analog processing circuit 13 for performing amplification, A/D conversion, etc., of the photo-electric conversion signal from the CCD 12, a drive circuit 14 for driving the lens unit 11 and CCD 12, and so on.

Each section of the digital camera is controlled by a CPU 15. A switch section 16 is connected to the CPU 15 and comprises a release switch, a switch for designating an object, a switch for designating various kinds of image processing, and so on.

The output of the analog processing circuit 13 is connected to a digital processing circuit 17 and the digital processing circuit 17 performs various kinds of digital processing. To the digital processing circuit 17, a memory section 18, MPEG processing section 19, JPEG processing section 20 and object detecting section 21 are connected.

The memory section 18 has a function as a buffer memory, temporarily stores image data obtained by the image capturing section and is used also as a working area for the image processing. The MPEG processing section 19 performs compressing and coding processing on a moving image represented by MPEG 2 and MPEG 4 and the image is compressed and coded by utilizing an interframe and intraframe correlation. The JPEG processing section 20 performs the compressing and coding processing on a still image and the image is compressed and coded by utilizing the intraframe correlation of the still image. The object detecting section 21 extracts object information included in the moving image from the information obtained in the course of the compression processing by the MPEG processing section 19.

The digital processing circuit 17 performs various kinds of processing as will be later described, by passing various kinds of information to and from the memory section 18, MPEG processing section 19, JPEG processing section 20 and object detecting section 21, etc.

The digital processing circuit 17 performs various kinds of processing, such as the object extracting processing and adaptive tone curve correction processing, on the basis of object information extracted in the course of the compression processing by the MPEG processing section 19. The digital processing circuit 17 performs various kinds of signal processing, such as the brightness level and color tone conversion, white balance adjustment and gamma correction. Further, the digital processing circuit 17 also performs processing for decompressing the compressed image data. The digital processing circuit 17 feeds the information on the brightness, frequency, etc., of a selected object back to the lens unit 11 through the CPU 15, etc. The image capturing condition of the exposure, focusing, etc., relating to the selected object is optimized based on the fed-back information. When the moving image and still image are both captured and recorded, the digital processing circuit 17 performs interpolation processing on a dropped frame, as will be described below, with the use of the correlation information on the moving image obtained in the compression processing and this is done in order to avoid an unnatural display resulting from such a dropped frame.

The output of the digital processing circuit 17 is connected to a D/A conversion circuit 22. The image is displayed on the LCD 23 on the basis of the signal D/A converted by the D/A conversion circuit 22. The LCD can display either of an image obtained by skipping over pixels of the captured moving image and an image obtained by applying decompression processing to the compressed moving image. A marker is also displayed on the LCD 23 to designate an object.

Further, the digital processing circuit 17 can transmit and receive information to and from an HDD 24 and other recording media 25 (FD, memory card, etc.). By the selection of the compression rate and selection of the recording media, the image data is recorded on the HDD 24 and other recording media 25. The image data of a greater data amount, such as the moving image and lower compression-rate image, is recorded mainly in the HDD 24. The image data of a lower data amount, such as a still image, is recorded mainly in the above-mentioned other recording media. By recording the image data on a predetermined recording medium in accordance with the type of image, that is, in accordance with the moving image, the still image or the type of image processing, it is possible to control the different type of image data for each recording medium.

(Operation)

Figure 4:
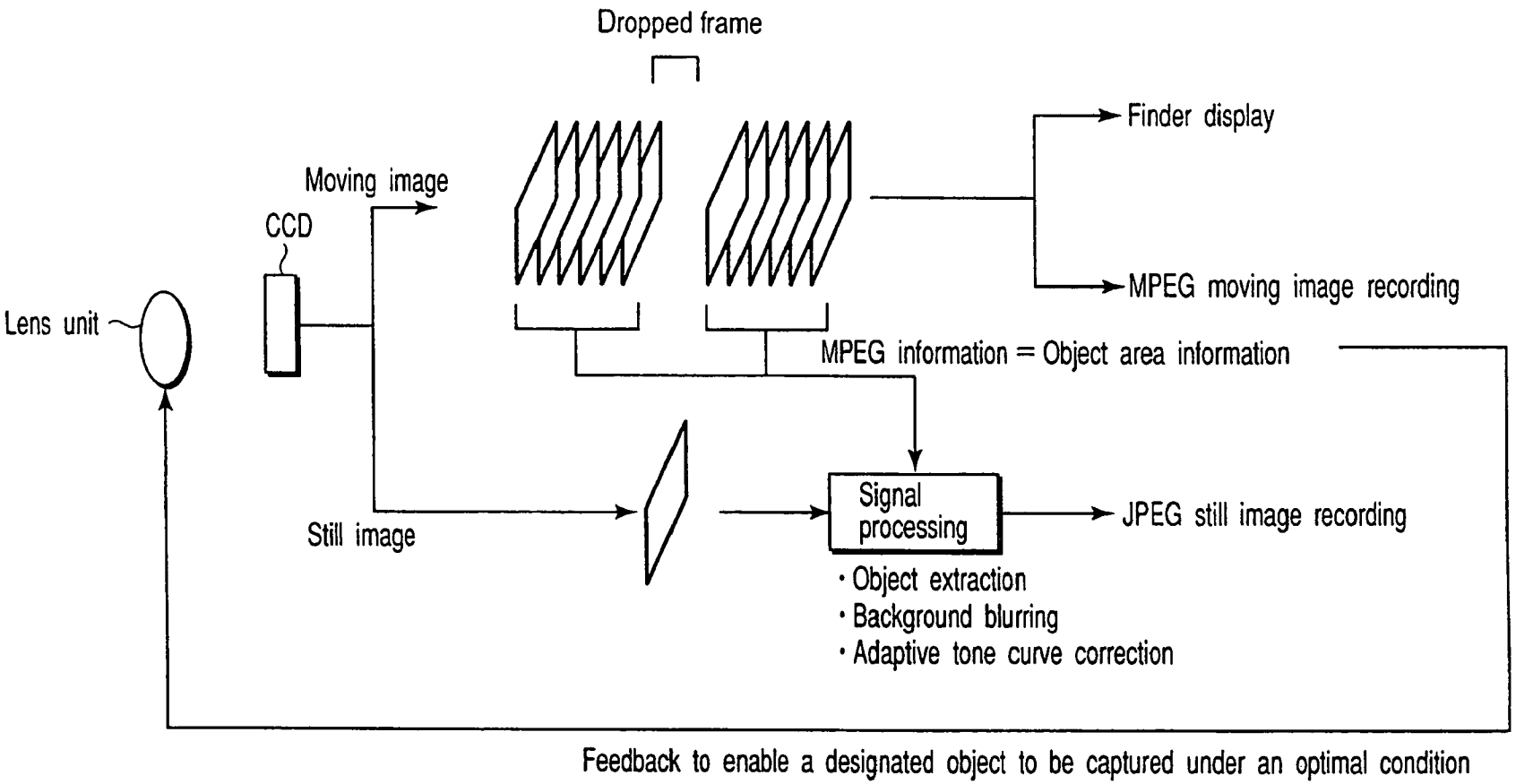
FIG. 4 is a view showing an outline of the operation of the image capturing device of the present invention.

FIG. 4 is a view briefly showing the operation of the present embodiment.

Usually, the moving image is obtained at a predetermined rate of, for example, 30 frames/sec., and displayed on the LCD image screen (finder screen) and the moving image data compressed by the MPEG processing is recorded on the recording media, such as the hard disk. Further, the object information included in the moving image is extracted from the information obtained in the course of the MPEG processing. In order to allow a designated object to be captured under the best conditions, the information based on the extracted object information is fed back to the lens unit (imaging lens, diaphragm, shutter, etc.).

In the case where the still image is obtained, it is captured by the release operation when needed. After desired signal processing (object extraction, background blurring, adaptive tone curve correction, etc.) has been performed on the captured image, the JPEG-processed still image is recorded on the recording medium.

When the still image is captured, the image capturing conditions are set in a different fashion from when the moving image is captured. For example, an optimal image capturing condition is set to a designated object. It is, therefore, not possible to use the image data obtained as a still image directly as one frame of the moving image. In order to avoid a frame-dropped moving image, the dropped frame is interpolated with the use of correlation information obtained in the course of the MPEG processing. Stated in more detail, the dropped moving image frame is interpolated by utilizing correlation information of those moving image frames before and after the dropped frame. Even if a still image is captured in the midst of capturing a sequence of a moving image, the dropped frame of the moving image is interpolated by the above-mentioned processing and it is possible to obtain a natural moving image.

Figure 5:
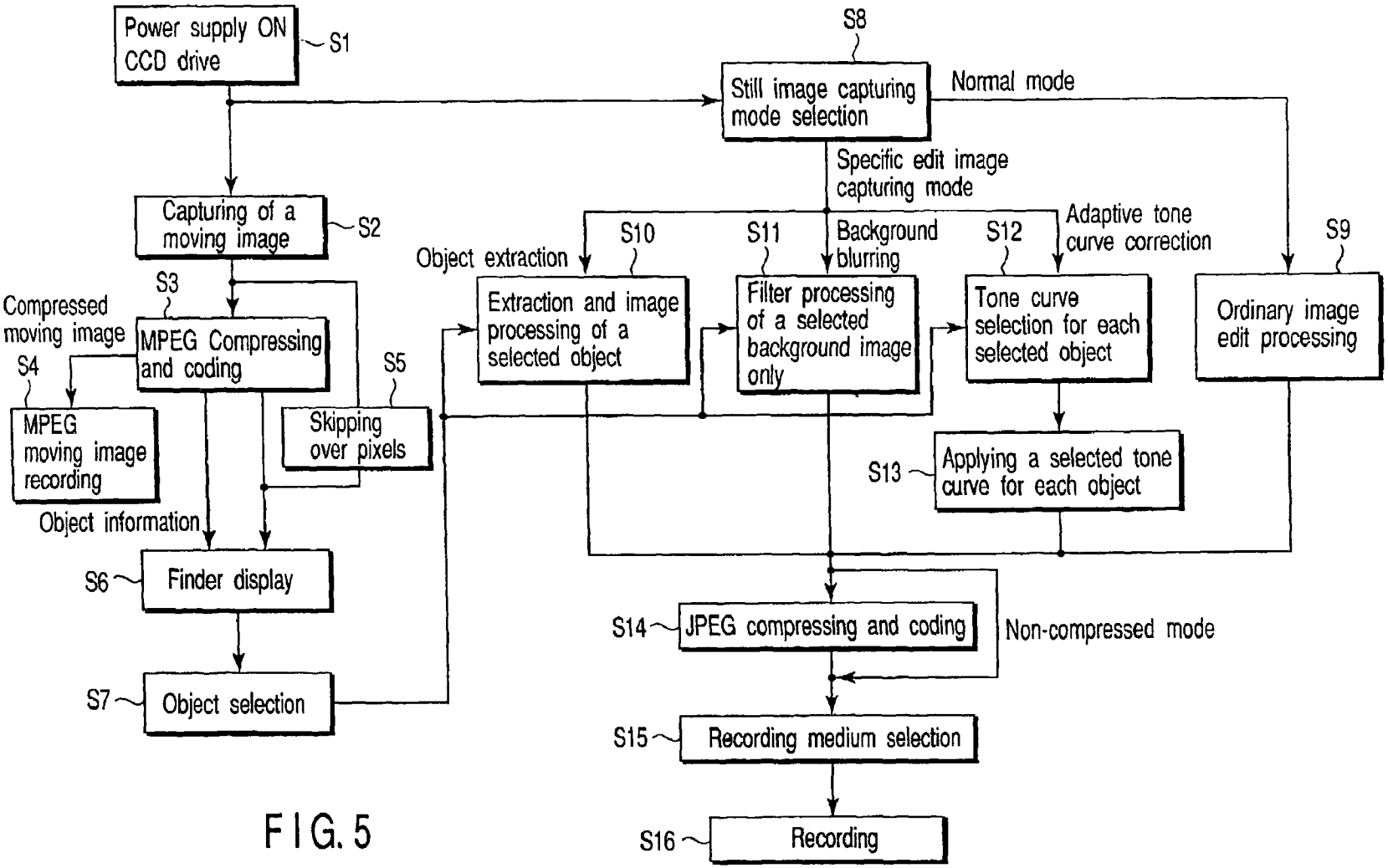
FIG. 5 shows a flow of the processing on the image capturing device of the present invention.

FIG. 5 is a view showing a flow of processing relating to the operation of the image capturing device of the present embodiment.

A power supply is turned ON and the CCD is driven (S1) and a moving image is continuously captured so as to obtain object information from the MPEG information (S2). The obtained moving image data is compressed and coded by the MPEG processing (S3). The compressed moving image data is recorded on the recording medium such as a hard disk (S4). On the moving image data, the processing for decompressing the compressed data or processing for skipping over the pixels is performed (S5). And the moving image is displayed on the finder (LCD image screen)-S6. Further, objects are specified based on the object information obtained in the MPEG processing and, since a marker is displayed on the image screen in a way to correspond to each object, the photographer can select a desired object by the switch operation (S7).

If a still image capturing mode is selected (S8), the following processing is done.

In a normal mode, an ordinary image edit processing is carried out and processing, such as the brightness, color tone, white balance, and gamma correction, is performed (S9).

In a specific edit image capturing mode, various kinds of processing are performed on an object designated at step S7. In the case of an object extracting image capture, only a selected object is extracted and image processing is performed only on the extracted object (S10). In the case of a background-blurring image capture, filter processing is performed only on the selected background image (S11). In the case of an adaptive tone curve correction image capture, a tone curve is selected for each selected object (S12) and, with the use of the selected tone, processing is done on each object (S13).

The image data of the thus obtained still image is compressed and coded by the JPEG processing (S14) and, in the case of a non-compressed mode, not being compressed, it is recorded on a selected recording medium (S15, S16).

Figure 6A:
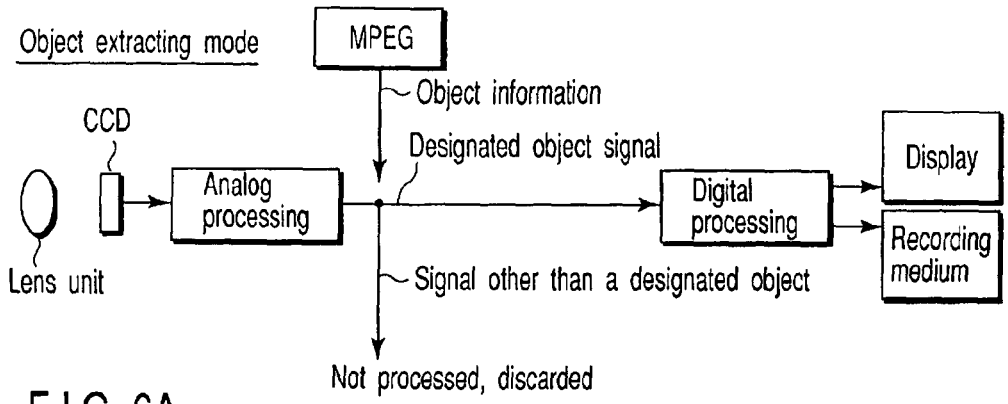
FIG. 6A is a view showing an outline of a flow of processing in an object extracting mode on the image capturing device according to the embodiment of the present invention.
Figure 6B:
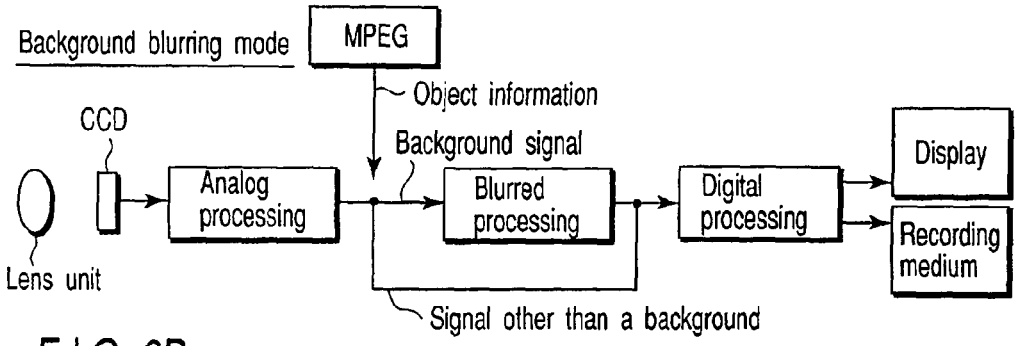
FIG. 6B is a view showing an outline of processing in a background-blurring mode on the image capturing device according to the embodiment of the present invention.
Figure 6C:
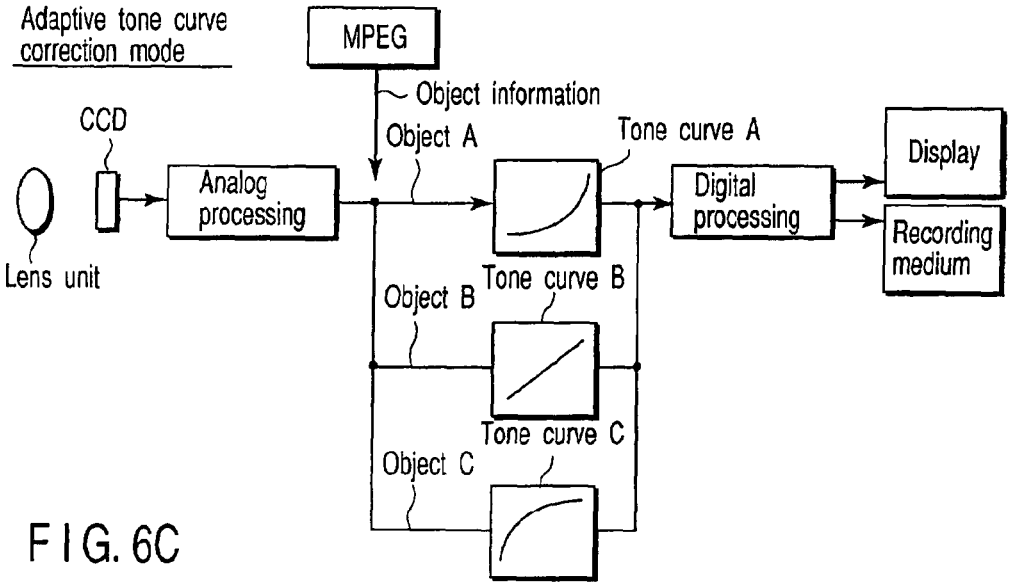
FIG. 6C is a view showing an outline of a flow of processing in an adaptive tone curve correction mode on the image capturing device according to the embodiment of the present invention.

FIGS. 6A, 6B and 6C are views schematically showing a flow of processing in respective modes (object extraction mode, background-blurring mode and adaptive tone curve correction mode) relating to the operation of the present embodiment.

In the object extraction mode, out of the image data of a captured still image, only a signal of a designated object is subjected to digital processing on the basis of the object information obtained by the MPEG processing and the other signal is discarded without being processed. On the designated object, predetermined digital processing is performed and it is displayed on the LCD and recorded on the recording medium on the basis of a signal on which the digital processing is done.

In the background-blurring mode, out of the image data of a captured still image, only a background signal is blur-processed based on the object information obtained by the MPEG processing. The blur-processed background signal, together with a non-background signal, is subjected to predetermined digital processing. Based on the signal on which the digital processing is performed, it is displayed on the LCD image screen and recorded on the recording medium.

In the adaptive tone curve correction mode, correction processing is done on respective objects (objects A to C) extracted based on the object information obtained by the MPEG processing and this is done so with the use of respective predetermined tone curves (tone curves A to C). The image data of a tone curve-corrected still image is subjected to predetermined digital processing and, based on the digital-processed signal, it is displayed on the LCD image screen and recorded on the recording medium.

According to the embodiment of the present invention, as set out above, object information is extracted in the course of the compressing and coding processing on the moving image and the image processing is selectively applied to the extracted object. It is, therefore, possible to efficiently perform image processing in real time and to quickly and readily confirm a still image subjected to desired image processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing device for capturing an image, comprising:

a camera capturing a moving image including images of objects through a lens unit;

[a compressing] *an object detection* section which [compresses the moving image captured by the camera and] obtains information relating to at least one of the objects included in the moving image, by utilizing interframe correlation in the moving image captured by the camera;

a digital processing circuit extracting information relating to the object which is being included in a still image to be captured by the camera from the information relating to the object obtained by the [compressing] *object detection* section [relative to the moving image]; and a CPU setting an imaging condition of the camera for capturing the still image [of] *including* the object based on the information relating to the object *included in the still image* extracted by the digital processing circuit.

2. The image capturing device according to claim 1, *further comprising a displaying section displaying the moving image including the object captured by the camera,* wherein the CPU further sets an image processing with respect to the still image including the object to be captured by the camera based on [the] information relating to the object [extracted by the digital processing circuit] *designated from the moving image displayed in the displaying section*.

[3. The image capturing device according to claim 1, further comprising a displaying section displaying the moving image including the object captured by the camera.]

[4. The image capturing device according to claim 3, wherein the object included in the still image to be captured by the camera is designated from the moving image displayed in the displaying section.]

[5. The image capturing device according to claim 3, wherein the CPU further sets an image processing with respect to the still image including the object to be captured by the camera based on information relating to the object designated from the moving image displayed in the displaying section.]

[6. The image capturing device according to claim 1, wherein an imaging condition for capturing a still image of the object differs from an imaging condition for capturing the moving image.]

7. An image capturing method for capturing an image, comprising:

capturing a moving image including images of objects through a lens unit of a camera;

[compressing the captured moving image and] obtaining information relating to at least one of the objects included in the moving image, by utilizing interframe correlation in the [captured] moving image [during compressing the captured moving image] *captured by the camera*;

extracting, *by a digital processing circuit,* information relating to the object which is being included in a still image to be captured by the camera from the *obtained* information relating to [said at least one of] the objects [obtained relative to the moving image]; and setting an imaging condition of the camera for capturing the still image including the object based on the extracted information relating to the object included in the still image.

8. The image capturing method according to claim 7, further comprising setting an image processing with respect to the still image including the object to be captured based on the extracted information relating to the object.

9. An image capturing device for capturing an image, comprising:

a camera capturing a moving image including images of objects through a lens unit;

[a compressing] *an object detection* section which [compresses the captured moving image captured by the camera and] obtains information relating to at least one of the objects included in the moving image, by utilizing interframe correlation in the moving image captured by the camera;

a digital processing circuit extracting information relating to the object which is being included in a still image to be captured by the camera from the information relating to the object obtained by the [compressing] *object detection* section [relative to the moving image]; and a CPU setting *a condition for* an image processing with respect to the [captured] still image including the object, based on the information relating to the object included in the still image extracted by the digital processing circuit.

10. The image capturing device according to claim 9, further comprising a displaying section displaying the moving image including the object captured by the camera.

[11. The image capturing device according to claim 9, wherein the object included in the still image to be captured by the camera is designated from the moving image displayed in the displaying section.]

[12. The image capturing device according to claim 9, wherein the image processing with respect to the still image includes a processing of discarding signals of images other than the object extracted by the extracting section.]

[13. The image capturing device according to claim 9, wherein the image processing with respect to the still image includes a blur-processing with respect to image other than the object extracted by the extracting section.]

[14. The image capturing device according to claim 9, wherein the image processing with respect to the still image includes a correction processing using a predetermined tone curve with respect to image data of the object extracted by the extracting section.]

[15. An image capturing method for capturing an image, comprising:

capturing a moving image including images of objects through a lens unit of a camera;

compressing the captured moving image and obtaining information relating to at least one of the objects included in the moving image, by utilizing interframe correlation in the captured moving image during compressing the captured moving image;

extracting information relating to the object which is being included in moving a still image to be captured by the camera from the information relating to said at least one of the objects obtained relative to the moving image; and setting an image processing with respect to the still image including the object, based on the extracted information relating to the object included in the still image.]

16. An image capturing device for capturing an image, comprising:

*a* camera [for] capturing a moving image including images of objects through a lens unit;

[compressing means for compressing the moving image captured by the camera and for obtaining] *an object detection section which obtains* information relating to at least one of the objects included in the moving image, by utilizing interframe correlation in the moving image captured by the [capturing means] *camera, and specifies the objects based on the obtained information relating to the objects*;

*a switch section designating a desired one of the objects specified by the object detection section;* a digital processing circuit [for] extracting information relating to *the* object [which is being included in a still image to be captured by the capturing means] *designated by the switch section* from the information relating to the [abject] *objects* obtained by the [compressing means relative to the moving image] *object detection section*; and a CPU [for] setting an imaging condition of the camera for capturing the still image including the object based on the information relating to the object *designated by the switch section* extracted by the digital processing circuit.

17. An image capturing device for capturing an image, comprising:

a camera [for] capturing a moving image including images of objects through a lens unit;

[compressing means for compressing the captured moving image captured by the camera and for obtaining] *an object detection section which obtains* information relating to at least one of the objects included in the moving image, by utilizing interframe correlation in the moving image captured by the [capturing means] *camera, and specifies the objects based on the obtained information relating to the objects*;

[a digital processing circuit for extracting information relating to the object which is being included in a still image to he captured by the camera from the information relating to the object obtained by the compressing means relative to the moving image;] *a switch section designating a desired one of the objects specified by the object detection section;* and a CPU [for] setting an image processing with respect to the still image including the object *designated by the switch section*, based on the information relating to the object [extracted by the digital processing circuit] *designated by the switch section*.

*18. The image capturing device according to claim 1, further comprising a release switch,*

*wherein the CPU performs control for causing the camera to capture the still image based on a release operation by the release switch, and*

*the digital processing circuit performs interpolation on a moving image frame dropped in capturing the still image by utilizing correlation information of those moving image frames existing before and after the captured still image.*

*19. The image capturing device according to claim 16, further comprising a displaying section displaying the moving image including the object captured by the camera,*

*wherein the displaying section displays markers corresponding to the objects specified by the object detection section, and*

*the switch section designates that one of the markers displayed in the displaying section which corresponds to a desired one of the objects.*

*20. The image capturing device according to claim 16, wherein the switch section includes a release switch,*

*the CPU performs control for causing the camera to capture the still image based on a release operation by the release switch, and*

*the digital processing circuit performs interpolation on a moving image frame dropped in capturing the still image by utilizing correlation information of those moving image frames existing before and after the captured still image.*

*21. The image capturing device according to claim 17, wherein the switch section includes a release switch,*

*the CPU performs control for causing the camera to capture the still image based on a release operation by the release switch, and*

*the digital processing circuit performs interpolation on a moving image frame dropped in capturing the still image by utilizing correlation information of those moving image frames existing before and after the captured still image.*

* * * * *